United States Patent
Salazar

[15] 3,637,242
[45] Jan. 25, 1972

[54] TABLE LEG ASSEMBLY

[72] Inventor: Rafael D. Salazar, 3113 75th Ave., Landover, Md. 20785

[22] Filed: June 30, 1970

[21] Appl. No.: 51,296

[52] U.S. Cl. ............................................. 287/23, 287/127
[51] Int. Cl. ............................................. F16b 12/50
[58] Field of Search ............ 108/156; 248/188, 151; 287/23, 287/20, 127, 20.92 E, DIG. 8

[56] References Cited

UNITED STATES PATENTS

| | | | |
|---|---|---|---|
| 604,322 | 5/1898 | Heine et al. | 108/156 |
| 1,073,964 | 9/1913 | Dabbs | 248/188 |
| 1,558,618 | 10/1925 | Jasper | 248/188 |
| 2,611,672 | 9/1952 | Ohlsson | 248/188 |
| 2,954,638 | 10/1960 | Motter | 248/188 X |
| 3,182,846 | 5/1965 | Lakaff | 108/156 UX |
| 3,291,079 | 12/1966 | Ruda | 248/188 X |

FOREIGN PATENTS OR APPLICATIONS

| | | | |
|---|---|---|---|
| 1,272,587 | 1961 | France | 248/188 |

*Primary Examiner*—Andrew V. Kundrat
*Attorney*—Lane, Aitken, Dunner & Ziems

[57] ABSTRACT

A table leg assembly for tubular legs in which a dowel member of noncircular cross section is secured against the inside wall surfaces of the leg and projects from the end of the leg to be received in a complementary aperture or recess formed in the undersurface of a tabletop, for example. The dowel member is smaller in cross-sectional dimension than the inside of the tubular leg so that when so secured, it is eccentric to the axis of the leg, thereby enabling variation in leg position relative to the top.

4 Claims, 3 Drawing Figures

PATENTED JAN 25 1972 3,637,242

INVENTOR
RAFAEL D. SALAZAR

BY *Lane, Aitken, Dunner & Ziems*
ATTORNEYS

TABLE LEG ASSEMBLY

BACKGROUND OF THE INVENTION

This invention relates to table leg assemblies, and more particularly, it concerns an extremely effective, economic fastening arrangement for connecting tubular legs to tabletops and the like.

In the manufacture of low-cost tables, desks and the like, it is common practice to form tops of varying shapes and sizes using plywood or pressed wood cores covered with a decorative, hard-wearing surface laminate available commercially under such trade names as "Formica," "Textolite" and "Micarta." Tops formed in this way are customarily supported on legs capable of assembly with the top with a simple tool, such as a screwdriver or pliers, thus enabling shipment of a complete table or desk in a compact, easily handled carton and assembly thereof by the ultimate consumer.

Many diverse types of fastening devices have been designed and are at present available commercially for connecting legs to tables and the like. While such fastening devices heretofore available meet the basic requirements for strength and ease of attachment, they have either added to the manufacturing cost of the article of furniture on which they are used or are restrictive in the achievement of a particular design or aesthetic appearance while at the same time accommodating the functional requirements of the fastening device. To illustrate, designs for low-cost tables and desks of the type referred to often call for the use of chrome-plated or otherwise appropriately finished tubular steel legs depending from the tabletop in cantilever fashion to provide a modernistic linear appearance. For example, a currently popular design necessitates a steel leg configuration in which the lines of the legs merge with those of the tabletop in a manner such that the edge surfaces of the tabletop are flush with the sides of the legs to simulate the appearance of the well-known "Parson's Table." The achievement of such designs using leg-fastening devices of the type heretofore available has posed problems to the designer and manufacture of such furniture so that either strength, economy or design or a combination of these factors is compromised in some measure.

SUMMARY OF THE PRESENT INVENTION

In accordance with the present invention, there is provided a leg assembly for tables and the like in which a tubular leg, having an end finished to abut the under surface of a tabletop with which it is used, is fitted with a dowel member of noncircular external cross section secured along the inside wall surface of the tubular leg. The dowel member cross section is preferably a regular polygon such as a triangle, square, hexagon or the like and is of an exterior dimension substantially smaller than the inside cross section of the leg so that the dowel axis is eccentric with respect to the axis of the leg. The dowel projects beyond the upper abutting end of the leg and is received within a complementary recess formed in the under surface of the tabletop. In a preferred embodiment, both the dowel and the leg are of rectangular section, the dowel being located in one corner of the leg so that although the location of the dowel and recess is spaced inwardly from the corner of the tabletop, the exterior surfaces of the leg can be made flush with the edges of the tabletop. Suitable means, such as a setscrew, is provided in the tabletop to anchor the assembly. Also, variance in design may be achieved by the ultimate consumer merely by changing the direction of dowel eccentricity in relation to the table edges. In other words, by appropriate location of the recess to receive the projecting dowel, the leg may be mounted either so as to be flush with the top edge surfaces or recessed inwardly with respect thereto.

Among the objects of the present invention are therefore: the provision of a highly effective leg assembly for low-cost tables and desks by which the problems heretofore experienced in attaching tubular legs to tabletops and the like are substantially overcome; the provision of a table leg assembly of the type referred to which facilitates use in a wide variety of table designs; and the provision of a table leg assembly of the type referred to which is simple or uncomplicated in design and thus economically employed.

Other objects and further scope of applicability of the present invention will become apparent from the detailed description to follow taken in conjunction with the accompanying drawings.

DETAILED DESCRIPTION OF THE PREFERRED EMBODIMENT

Figure 1:
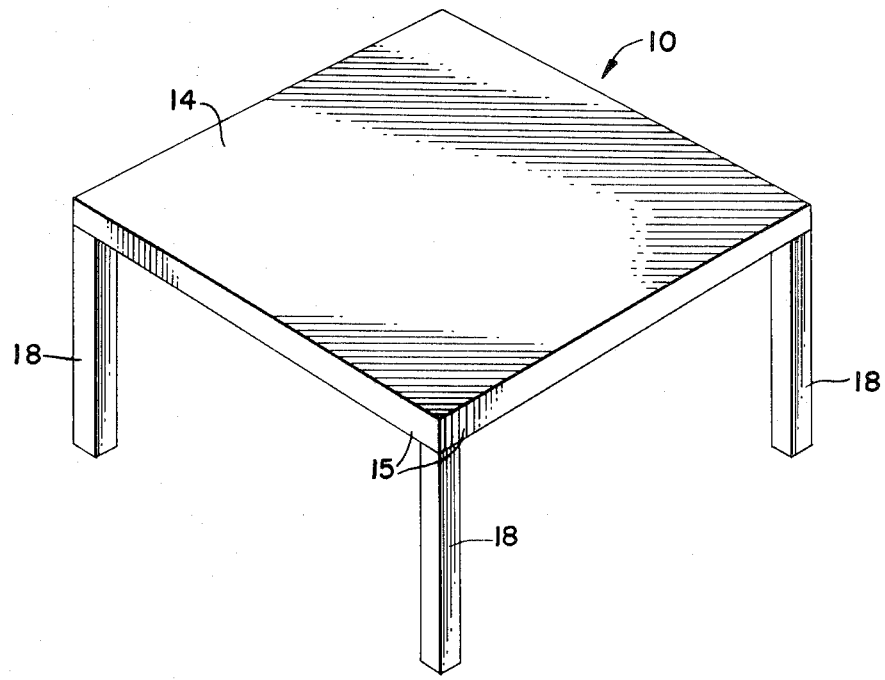
FIG. 1 is a perspective view of a table incorporating the leg assembly of the present invention.
Figure 2:
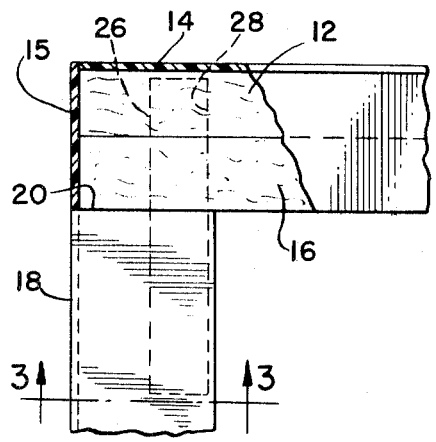
FIG. 2 is an enlarged fragmentary side elevation of the table leg assembly of this invention.

In the drawings, the leg assembly of the present invention is shown to be embodied in a table styled in the manner of the well-known "Parson's Table." The table includes a top, generally designated by the reference numeral 10, formed with a core 12 of commercially available pressed wood or the like covered on its top and edge surfaces with a protective and decorative laminate 14 such as "Formica" or the like. To achieve the desired thickness at the edges 15 of the tabletop 10 and also to provide adequate core strength for connection of the leg assembly of this invention in a manner to be described more in detail below, a cleat 16 is glued or otherwise firmly secured to the undersurface of the core along the edges thereof prior to the application of the edge laminate 14.

The tabletop 10 is supported by four legs 18 in the embodiment shown, though it will be appreciated that the actual number of legs employed may be varied in accordance with different table designs. Each of the legs 18, as shown most clearly in FIG. 3 of the drawings, is in the form of a rectangular or square tube of steel or other suitable material coated or plated with an appropriate decorative exterior finish. In keeping with the classic Parson's Table design, the exterior dimensions of the legs 18, in cross section, are approximately the same as the edge thickness of the tabletop 10. Also in such tables, the surfaces of the legs 18 are flush with the edge surfaces 15 of the tabletop in a manner such that the corner line on the top 10 is aligned with the outermost corner line of the leg. Also, it will be noted that each of the legs 18 is provided with a substantially perpendicular upper end 20 for abutment with the under surface of the tabletop 10, specifically the cleat 16.

Figure 3:
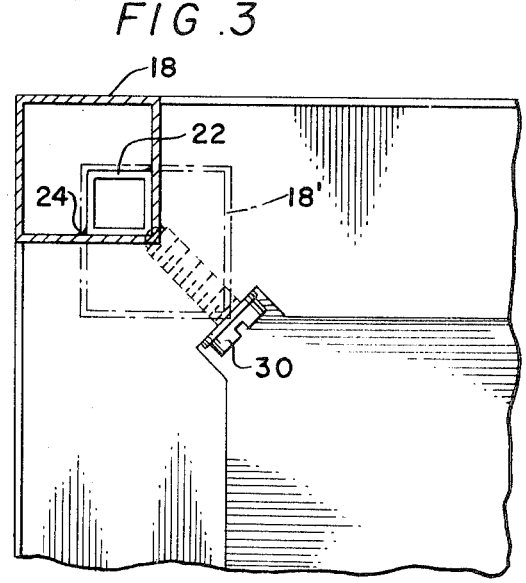
FIG. 3 is a fragmentary cross section taken on line 3—3 of FIG. 2.

A dowel member 22 of square exterior cross section, in the embodiment shown, is secured to the inside wall surface of each of the tubular legs 18, preferably at the corner thereof, by suitable means such as welds 24. The dowel members 22 are of sufficient length to enable a strong securement with the leg and also to provide an upwardly extending portion 26 to be received within a recess 28 formed in the tabletop 10 and being complementary in shape with the exterior shape and size to the exterior cross section of the dowel member 22. The cross-sectional dimensions of the dowel member 22, as shown in FIG. 3 of the drawings, are substantially smaller than the inside cross-sectional dimensions of the leg 18 or approximately one-fourth thereof in the embodiment illustrated, thereby positioning the longitudinal axis of the dowel 22 in eccentric relationship with the longitudinal axis of the leg 18. Thus to achieve the Parson's Table design of FIG. 1, the recess or hole 28 within which the dowel member 26 is received, may be located inwardly of the table edges by a sufficient amount to develop necessary strength. Yet because of the eccentricity, the outermost side surfaces of the leg 18 may be positioned flush with the edges of the tabletop 10.

To secure the leg to the top 10, suitable means such as a set screw 30 is threadably received in a diagonal bore formed in the cleat 16 on the underside of the tabletop 10. Thus it will be appreciated that the legs 18 may be shipped or transported in an unassembled condition and readily attached to the top with no more skill or special tools than a screwdriver and the ability to use it.

It is contemplated that the leg assembly 18 will be used in table designs other than the Parson's Table illustrated in FIG. 1 of the drawings. For example, and as shown in FIG. 3 of the drawings, to achieve a table design in which the leg is recessed with respect to the edges 15 of the tabletop 10, it is possible to orient the leg assembly in the position illustrated by phantom lines in FIG. 3, inserting the dowel member 22 into the recess 28 in the same manner as above mentioned. Because of the square configuration of the dowel 22 and the recess 28, any one of four selected positions for the leg will be maintained in positive fashion. Hence, the inventory requirement for a manufacturer to achieve different designs of tables is reduced substantially. Moreover, by forming the recess 28 and the dowel member 22 with other regular polygonal cross-sectional configurations, such as a triangle or hexagon, the number of positions in which the leg can be located to the corner of the tabletop 10 may be increased or decreased as desired.

Thus it will be appreciated by those skilled in the art that by this invention there is provided a very simple and economically produced table leg assembly by which such factors as versatility of design, strength and economy are simultaneously achievable. Also, it will be appreciated that the present invention is subject to many variations without departing from the true spirit and scope thereof. Accordingly, it is expressly intended that the foregoing description is illustrative of a preferred embodiment only, not limiting, and that the true spirit and scope of the present invention will be determined by reference to the appended claims.

I claim:

1. A table leg assembly comprising: a tubular leg of regular polygonal cross-sectional configuration having an open end to abut the undersurface of a tabletop or the like, and a dowel member permanently secured, such as by welding, against the inside wall surface of said tubular leg and having a projecting portion extending beyond said abutment open end of said leg, said dowel member having a regular polygonal outside cross-sectional configuration of a size substantially smaller than the inside cross section of said leg but of the same shape as said leg, and leaving a free space between a portion of the inside wall surface of said leg and the opposed portion of the outside periphery of said dowel not secured against the inside wall surface of the leg so that the axis of said dowel member is eccentric with the axis of said leg, said projecting portion of said dowel member being receivable in a recess of complementary size and shape formed in the tabletop in any one of a plurality of angular positions determined by the number of sides on said regular polygonal outside cross-sectional configuration, thereby to enable selective variation in the axial positioning of said leg with respect to the recess and the tabletop.

2. The table leg assembly recited in claim 1 wherein said leg and said dowel are both rectangular cross-sectional configuration.

3. The table leg assembly recited in claim 2 wherein said dowel is secured in a corner of said leg.

4. A table leg assembly comprising: a tubular leg having an end to abut the undersurface of a tabletop or the like, and a dowel member secured along the inside wall surface of said tubular leg and having a projecting portion extending beyond said abutment end of said leg, said dowel and said leg being square in cross-sectional configuration, the external size of said dowel being approximately one-fourth the size of the interior size of said leg, said dowel being secured in a corner of said leg, the axis of said dowel member being thereby eccentric with the axis of said leg, said projecting portion of said dowel member being receivable in a recess of complementary size and shape formed in the tabletop.

* * * * *